United States Patent [19]

Herren et al.

[11] Patent Number: 5,343,491

[45] Date of Patent: Aug. 30, 1994

[54] METHOD OF SUPPRESSING DUST AND FUMES DURING ELECTRIC STEEL PRODUCTION

[75] Inventors: Georges Herren, Rosshäusern; Dieter Reiber, Gerlafingen, both of Switzerland

[73] Assignee: Carbagas and Von Roll AG, Switzerland

[21] Appl. No.: 981,614

[22] Filed: Nov. 25, 1992

[30] Foreign Application Priority Data

Nov. 28, 1991 [EP] European Pat. Off. ........ 91810930.7

[51] Int. Cl.⁵ ............................................. F27D 17/00
[52] U.S. Cl. ........................................... 373/8; 373/9; 164/475; 75/559; 62/12
[58] Field of Search ..................... 373/8, 9, 22, 23, 18, 373/42, 60, 73, 74, 77; 75/554, 557, 559, 584, 709, 51.7, 59; 164/475, 66.1, 259, 207, 415, 67.1; 266/144, 266; 62/12

[56] References Cited

U.S. PATENT DOCUMENTS

| | | | |
|---|---|---|---|
| 3,598,573 | 8/1971 | Freissmuth et al. | 75/312 |
| 3,640,702 | 2/1972 | Karinthi et al. | 75/59 |
| 3,676,963 | 7/1972 | Rice et al. | 51/320 |
| 3,775,099 | 11/1973 | Coffield et al. | 75/119 |
| 3,783,167 | 1/1974 | Tylko | 373/23 |
| 3,861,888 | 1/1975 | Heise et al. | 75/60 |
| 3,932,172 | 1/1976 | Knuppel et al. | 75/60 |
| 4,165,233 | 8/1979 | Gagneraud | 75/24 |
| 4,225,565 | 9/1980 | Marukawa et al. | 423/208 |
| 4,321,088 | 3/1982 | Boehm et al. | 75/59 |
| 4,398,948 | 8/1983 | Emoto et al. | 75/60 |
| 4,415,142 | 11/1983 | Hegemann et al. | 266/89 |
| 4,456,477 | 6/1984 | Masuda et al. | 75/51 |
| 4,458,883 | 7/1984 | Billings et al. | 266/44 |
| 4,518,421 | 5/1985 | Foulard | 75/49 |
| 4,614,216 | 9/1986 | Savard et al. | 164/67.1 |
| 4,652,287 | 3/1987 | Allen et al. | 62/35 |
| 4,664,703 | 5/1987 | Landreth | 75/96 |
| 4,666,511 | 5/1987 | Naud | 75/51.7 |
| 4,780,119 | 10/1988 | Brooke | 62/12 |
| 4,781,122 | 11/1988 | Foulard et al. | 164/475 |
| 4,814,006 | 3/1989 | Gorjup et al. | 75/59.12 |
| 4,915,362 | 4/1990 | Borasci et al. | 266/266 |
| 4,916,922 | 4/1990 | Mullens | 62/384 |
| 4,990,183 | 2/1991 | Anderson et al. | 75/555 |
| 5,148,679 | 9/1992 | Eve | 62/10 |

FOREIGN PATENT DOCUMENTS

| | | |
|---|---|---|
| 07071359 | 7/1982 | European Pat. Off. . |
| 0125173 | 11/1984 | European Pat. Off. . |
| 0154585A2 | 2/1985 | European Pat. Off. . |
| 0196242 | 10/1986 | European Pat. Off. . |
| 0274290 | 7/1988 | European Pat. Off. . |
| 0288369 | 10/1988 | European Pat. Off. . |
| 0383184 | 8/1990 | European Pat. Off. . |
| 2607829 | 6/1988 | France . |
| 2607829 | 10/1988 | France . |
| 2635789 | 2/1990 | France . |

OTHER PUBLICATIONS

Klaus Grutzmacher, Hans de Haas, Horstmar Mohnkern, Klaus Ulrich und Helmet Kahnwald, "Staubunterdruckung in HochofengieBhallen", Stahl u. Eisen 111, (1991), No. 3, Mar. 15, 1991.

Primary Examiner—Bruce A. Reynolds
Assistant Examiner—Tu Hoang
Attorney, Agent, or Firm—Limbach & Limbach

[57] ABSTRACT

During melting in an electric melting furnace of iron products such as pig iron, scrap iron, directly reduced iron pellets, and various alloy metals, or mixtures of the foregoing having greatly varying impurities, solid carbon dioxide is led over the melting hearth shortly before, during, and after charging. Explosive burning of the combustible constituents is thus prevented in that the oxygen is displaced during the charging operation by the expanding gaseous carbon dioxide produced. The method makes possible electric steel production with reduced accumulation of dust and fumes in that formation thereof is largely eliminated directly at the source. By cutting down on the high volumes of gas and gas temperatures occurring during charging without carbon dioxide, substantially smaller filter installations are needed, whereby the amount of savings on investment and operating costs economically compensates for the cost of the carbon dioxide utilization.

12 Claims, 3 Drawing Sheets

METHOD OF SUPPRESSING DUST AND FUMES DURING ELECTRIC STEEL PRODUCTION

BACKGROUND OF THE INVENTION

1. Field of the Invention

This invention relates to the manufacture of electric-furnace steel, and more particularly to a method of suppressing dust and fumes in the production of electric steel in an electric melting furnace from iron products containing combustible constituents.

The invention is intended especially for use in the production of electric steel from mixtures containing iron components, such as pig iron, scrap, or directly reduced iron pellets, having very greatly varying impurities.

2. Discussion of the Prior Art

The dust and fumes occurring during iron production has heretofore been exhausted, eliminated in filter installations, and collected for further disposal as waste. With the increasing demands of environmental protection legislation, the ejection of dust from melting plants must be continuously reduced, e.g., by enlarging the filter installations.

However, since the combustible pollutants in scrap keep augmenting owing to the growing use of plastics of all kinds in trade and industry, and the quality of the accumulating scrap shows a tendency to decrease, further steps for dust-suppression are indispensable. Consequently, tests have previously been carried out with inert gas for displacing the oxygen during charging of melting furnaces. For example, it has been attempted to diminish the oxygen content via the runner trough of the blast furnace by introducing natural gas. By this means, the quantity of dust accumulating could be reduced by about 60%. The method has the drawback, however, that the emissions of nitrogen oxide doubled (K. Grützmacher et. al., *Stahl und Eisen*, 111 (1991), No. 3, pages 51–56).

Further inertization tests have been undertaken with nitrogen since this gas is produced in sufficient quantity in air separation installations. The method made possible a drastic reduction in dust formation. A massive reduction nitrogen oxide formation could likewise be ascertained. The tests cited in the aforementioned publication were carried out in blast furnaces.

European Patent Application Publication No. 0 383 184 discloses a method for reducing dust emission and free air admission in the tapping area of a blast furnace. Here carbon dioxide snow or a mixture of liquid and solid carbon dioxide is fed to the molten crude iron/ferromanganese and/or placed in the area of the runner or tipping trough and possibly of the adjacent torpedo ladle simultaneously with the molten iron. Other methods in which carbon dioxide in gaseous, liquid, or solid form is used for protecting molten steel, particularly during casting, against oxidation and possibly nitriding, are described in French Patent Application Publication No. 2,607,829 and European Patent Applications Publication Nos. 0 154 585, 0 196 242, 0 274 290, and 0 288 369.

In the melting of iron products containing combustible constituents in an electric melting furnace, however, such tests have not yet been carried out since the technical problems are great. Contrary to the mentioned examples from metallurgy, it must be mentioned that in the case of the arc furnace, the skip is relatively large, and the furnace is open during charging. Owing to the heat and the molten heel of steel often subsisting in the furnace, an enormous thermal suction effect exists, which leads to a momentary replacement of air in the furnace. Moreover, the charging operation must be neither hindered nor delayed since the speed of this operation is of decisive importance for the efficiency of a melting furnace.

It is thereby clear that adequate inertization cannot be achieved through the supply of inert gases in gaseous form. The gas to be delivered must therefore be in condensed form so that a reasonable sojourn time may be expected. As in the SPAL process or in the CON-SPAL process in continuous casting, the problem must therefore be tackled with liquid or solid gases.

Supplying liquid nitrogen to a furnace containing partially molten metal involves the risk of retardation of ebullition, whereby uncontrollable effects may be exerted upon the furnace structure and the surroundings. The same applies to argon, which does not allow economical inertization in any case because of its high price.

SUMMARY OF THE INVENTION

Consequently, it is an object of this invention to provide a method for suppressing dust and fumes which allows effective inertization in an electric-steel furnace without the drawbacks mentioned above.

A further object of the invention is to provide such a method which reduces the formation of fumes and dust to a great extent at the source, so that the melting plant can manage with a filter installation of reduced dimensions.

To this end, in the method according to the present invention, solid carbon dioxide is led over or into the melting hearth shortly before, during, and after charging in order to prevent the explosive burning of the combustible constituents in that the oxygen is displaced immediately before, during, or after charging by the expanding gaseous carbon dioxide produced from the solid carbon dioxide.

The inventive method is utilized predominantly in the production of electric steel in an electric-arc furnace. In the production of steel by the electric-arc process, a charge of metal consisting of any desired mixtures of scrap, pig iron, directly reduced iron pellets, and various alloy metals is put in the melting furnace. Besides electric power, oxygen and fossil fuels may also be used as sources of energy for melting.

The melting furnace consists of a hearth lined with refractory materials for receiving the molten metal; seated thereon and flange-fixed thereto is the upper part of the furnace made of water-cooled pipe elements for receiving the scrap. The upper part of the furnace is capped by a swiveling furnace cover having apertures for the graphite electrodes, dust-removal connection, and alloying addition.

The electric power is supplied to the graphite electrodes by the furnace transformer over copper lines, the energy of the arc forming between the tips of the electrodes and the metal charge causing the charge to melt.

Prior to charging, the electrodes are removed from the furnace, the cover with the electrodes being swung away. The charging bucket then runs over the furnace, and the scrap material is unloaded into the melting hearth by opening the charging bucket. According to the present invention, as soon as the charging bucket is in charging position above the furnace, dry-ice snow is ejected from the preferably fixed snowpipes. If, alternatively, movable snowpipes are utilized, they are extended toward the melting hearth as far as is possible without hampering the charging operation. Preferably, a number of snowpipes, e.g., three, are used, leading laterally into the upper part of the furnace and positioned at an angle of about 120° from one another. As soon as the snowpipes are in position, dry ice is ejected. Charging takes place during the ejection of dry ice. By means of this procedure, the explosive expulsion of fumes through burning of the combustible scrap by-products is largely prevented.

In the inventive method, oxygen is withdrawn from the vicinity of the furnace hearth shortly before and during the charging operation by introducing solid carbon dioxide. The combustion process is thereby controlled in this critical phase of charging in such a way that the explosive formation of fumes is avoided. By means of the inventive method, it has become possible, through the use of solid carbon dioxide, to supply the gas required for inertization in a sufficiently dense form to achieve a reasonable sojourn time. One kilogram of dry ice is known to form app. 500 lt. of gaseous carbon dioxide. By means of the short-term penetration and spread of a sufficient quantity of carbon dioxide over the melting hearth in the arc furnace, it is possible to cover the molten steel bath adequately and to prevent an immediate replacement of the furnace atmosphere by air. The essential point of the inventive method is that shortly before, during, and after charging, the dry ice is supplied in solid form. The quantity of carbon dioxide is dependent upon the degree of contamination of the scrap with combustible substances. It is noted for the sake of completeness that the dry ice may also be utilized in commercially available form, e.g., as pellets or dry snow.

The snowpipes preferably form a fixed part of the upper part of the furnace made of water-cooled pipe elements, and the openings are kept clear during the melting phase by blowing in gases. Another possibility is to introduce the snowpipes laterally into the electric melting furnace to such an extent that they do not interfere with charging. As soon as the charging operation is finished, the snowpipes are retracted so that they are not damaged during the melting operation nor are in the way of work on the furnace. Shortly before charging of the melting hearth, after the cover with the electrodes has been swung away, the snowpipes are extended toward the opening of the melting hearth far enough so that the charging operation can take place unhampered. Just before, during, and after charging, carbon dioxide is blown in in such a way that dry ice develops in the snowpipe and undergoes such a degree of expansion owing to the heat of the melting furnace that the oxygen is displaced, whereby burning of the combustible material clinging to the scrap is delayed and no explosive fuming occurs.

The carbon dioxide is conveyed to the snowpipes from a large tank of liquid carbon dioxide, for example. Preferably, liquid carbon dioxide is converted into dry snow via an orifice which produces a sufficient drop in pressure, and the dry snow is blown into the arc furnace before and during charging. Solidifying takes place immediately prior to ejection through decompression of the carbon dioxide. As mentioned, commercially available dry ice in the form of dry snow or pellets may also be used in the inventive method.

For producing 70 tons of steel, about 700 kg. of carbon dioxide are normally required, i.e., 10 kg. of carbon dioxide per ton of steel. The carbon dioxide additionally has the further favorable side-effect of distinctly reducing the temperature of the exhaust fumes going into the filter installations. For one thing, this reduces wear and tear on the filter installation, and for another, investment and operating costs of the filter are cut down owing to the omission of additional cooling means.

Despite the added expense for the carbon dioxide, the inventive method is economical inasmuch as it entails not only lower investments for filter apparatus but also a not inconsiderable saving on the energy costs which would be incurred for the operation of substantially larger filters.

Since inertization is necessary shortly before and during charging, the snowpipes or the pipe for introducing dry ice must be secured in a position on the upper part of the furnace suitable for that purpose or brought into such a position over the melting hearth shortly before charging. The pipes must not project too far into the furnace since otherwise they may be damaged by the scrap.

In most cases, the charge of metal is loaded in a scrap bucket provided with a hinged bottom. For charging into the furnace, the scrap bucket runs over the furnace hearth—after the furnace cover has been swung away—and the charge drops into the furnace hearth upon actuation of the hinged bottom of the scrap bucket. After charging into the furnace, the contents of the bucket are melted down until there is again room enough in the hearth for the charge of another bucket, and so on. The number of scrap buckets per melt depends upon the tap weight of the furnace and the specific gravity of the charge. For a furnace having a tap weight of app. 70 tons, with two bucket charges, for example, 40 tons are used in the first bucket and 36 tons in the second.

The charge consists mainly of scrap containing greatly varying impurities of combustible substances such as oil, plastics, paint, textiles, wood, and the like.

When this scrap is charged in a hot furnace already containing metal which is partly molten, the aforementioned substances combust explosively if no inertization takes place. In that case, energy amounting to from 80–150 MW is produced within the space of only 10–20 seconds. Besides the volume of flue gases produced by the combustion, the ambient air is heated by this amount of energy. The blast-like expansion, occurring through this combined process, of the pollutant-loaded volume of air and flue gases has heretofore been contained in the steel-making shop at great expenditure and conveyed to the dust-removal plant. The inventive method reduces this expenditure considerably. Until now, the dust-removal systems had to be equipped with oversized filter installations just for processing this brief peak volume. The suction capacity for a 70-ton furnace ranges from 1–3 million cu.m./hr. Consequently, the inventive method makes possible a considerable lowering of investment and operating costs for such installations without jeopardizing the cleansing effect—on the contrary, it is improved.

Together with the filter installations which continue to be necessary, the inventive method permits the critical values required in future for heavy metals (zinc, lead, cadmium) in the dust-deposit near melting-furnace operations to be observed. The inventive process ought to contribute as well toward keeping the critical values for emissions of dioxins and furans from being exceeded.

BRIEF DESCRIPTION OF THE DRAWING

Preferred embodiments of the invention will now be described in detail with reference to the accompanying drawings, in which.

DETAILED DESCRIPTION OF THE INVENTION

Figure 1:
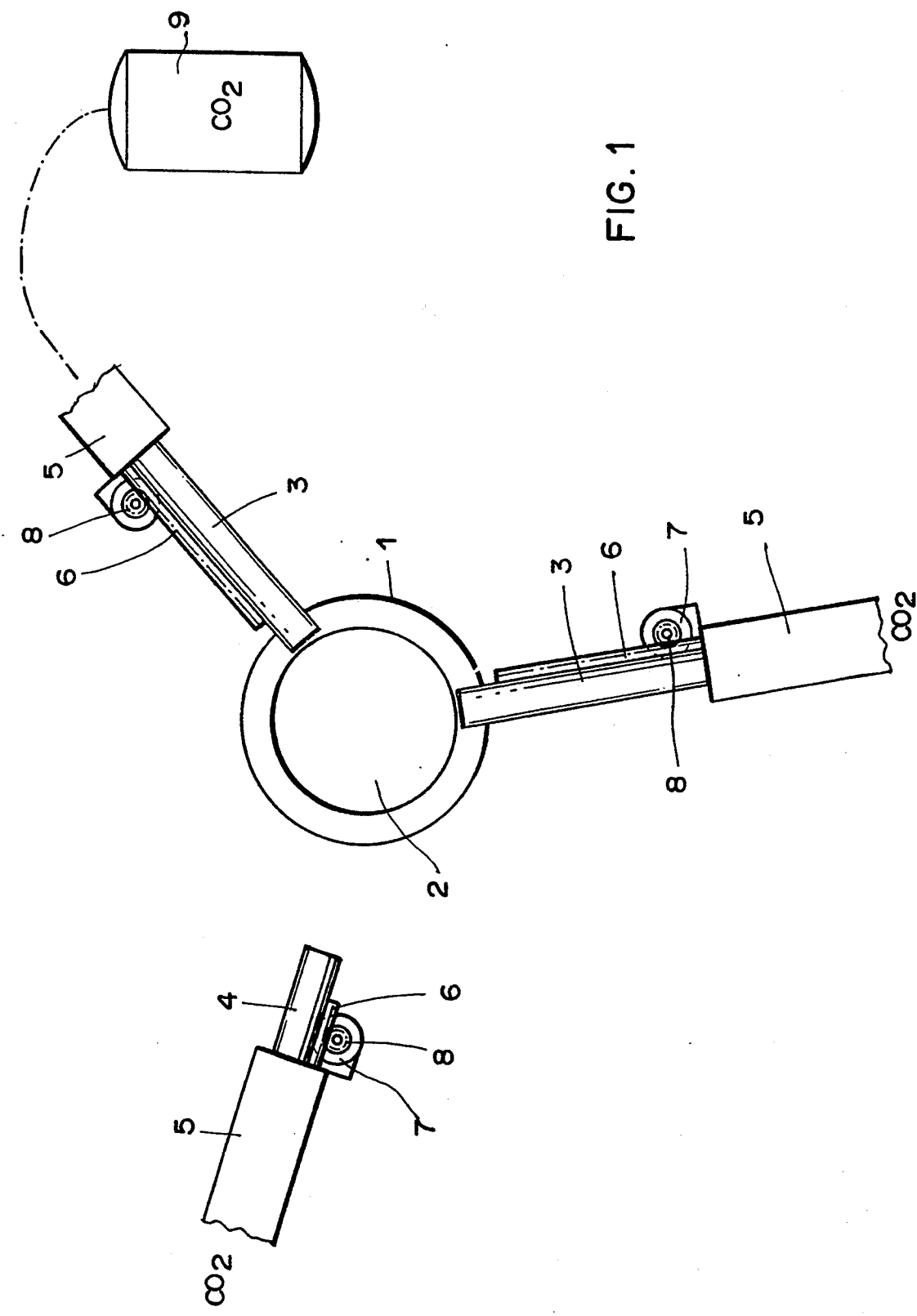
FIG. 1 is a top plan view of an electric melting furnace having movable snowpipes.

FIG. 1 shows schematically, from above, an electric melting furnace 1 with a melting hearth 2. Disposed laterally on hearth 2 are movable snowpipes 3 and 4. Snowpipes 3 are in position for supplying carbon dioxide dry ice, whereas snowpipe 4 is in retracted state. Snowpipes 3, 4 can be moved toward and away from furnace 1 by a mechanical device 6, 7, 8. Snowpipes 3, 4 are mounted on rollers in a guide apparatus 5. They are fed with liquid carbon dioxide from a central tank 9.

Figure 2:
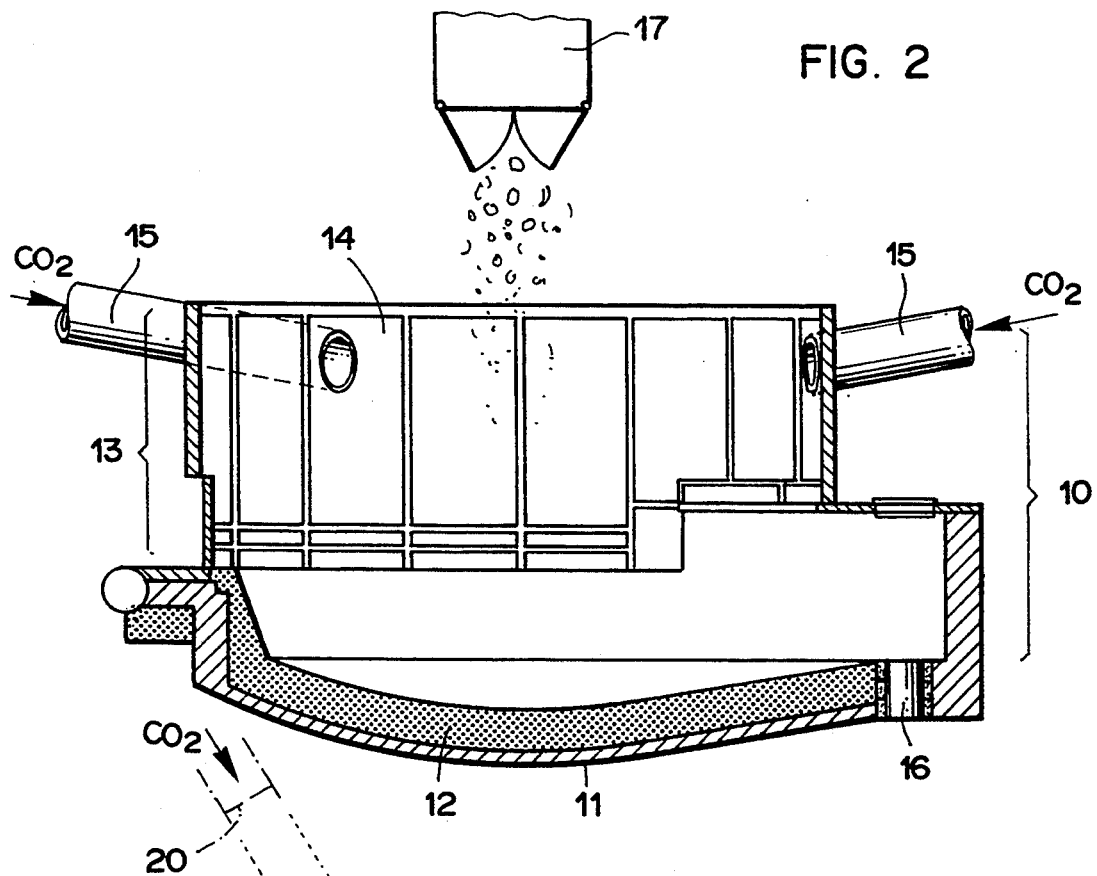
FIG. 2 is an elevation, partially in section, of an electric melting furnace having snowpipes fixed in the upper part of the furnace, including the charging bucket.

FIG. 2 is an elevation of an electric melting furnace 10 having a furnace hearth 11 provided with a refractory lining 12 and a water-cooled upper part 13 with water-cooled wall elements 14. Snowpipes 15 are fixed to selected wall elements 14. Hearth 11 has an eccentric runner opening 16 with plugs in the bottom area (bottom tap). Melting furnace 10 is charged with scrap by means of a charging bucket 17. Just before and during charging, solid carbon dioxide is introduced through snowpipes 15. As soon as charging is terminated, charging bucket 17 is withdrawn, and a furnace cover 18 (see FIG. 4) is moved over furnace 10 to reclose it. As soon as electrodes 19 (FIG. 4) are again in working position, the melting process is continued. The integrated snowpipes 15 are rinsed during the process with a sufficient quantity of carbon dioxide or some other suitable gas to avoid clogging.

Figure 3:
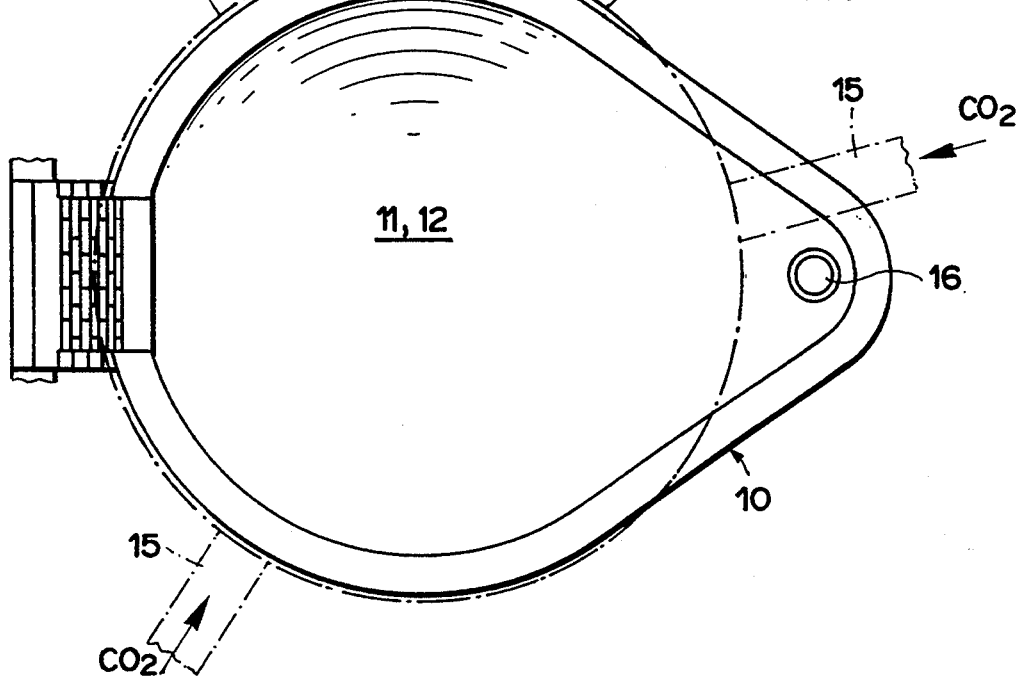
FIG. 3 is a top plan view of the electric melting furnace of FIG. 2.

FIG. 3 is a top plan view of the electric melting furnace 10 of FIG. 2, wherein the refractory-lined bottom hearth 11 with eccentric runner opening 16 and plugs are visible. Further depicted is the arrangement, as symmetrical as possible, of the snowpipes 15 fixed to the upper part 13 of furnace 10. Shown in one of snowpipes 15 is an orifice 20 at which a drop in pressure takes place when the carbon dioxide leaves the pipe, thus modifying the state of aggregation of the carbon dioxide.

Figure 4:
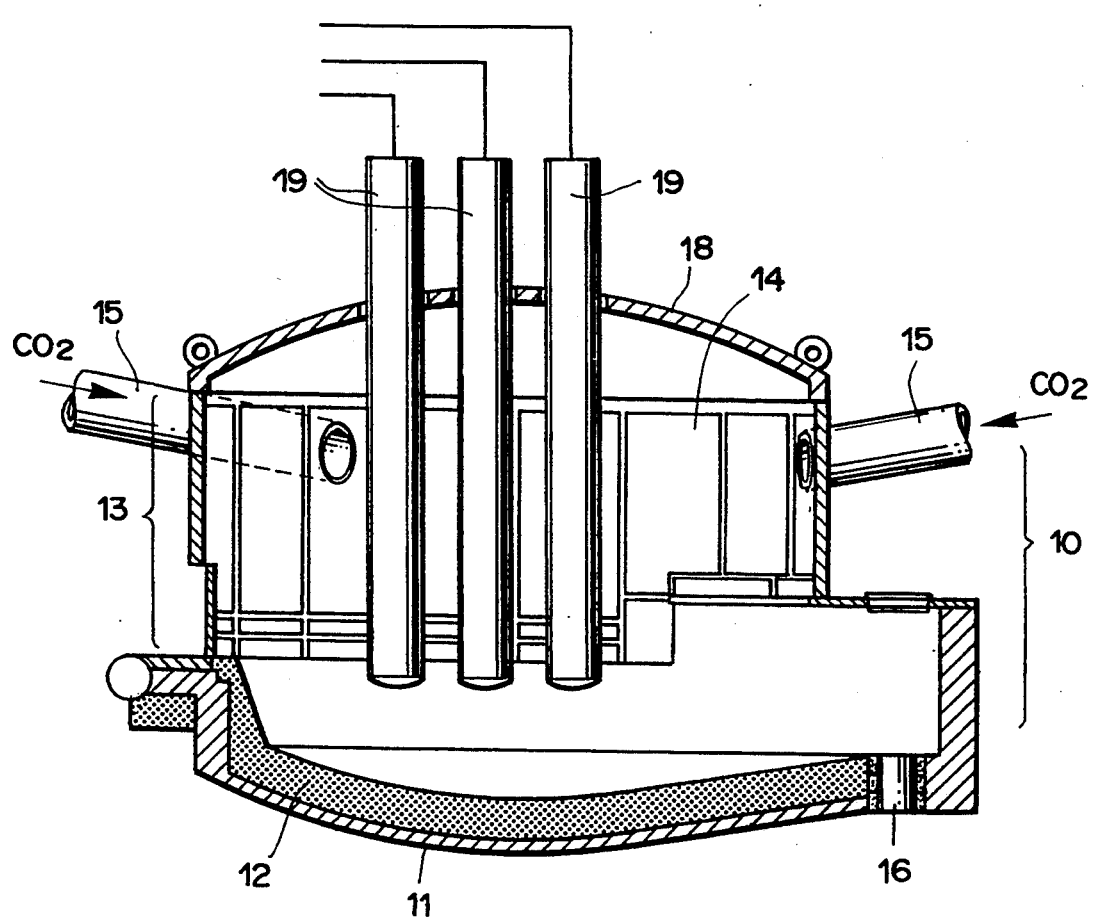
FIG. 4 is a view of the electric melting furnace analogous to FIG. 2 but with the furnace cover and the electrodes in place.

FIG. 4 is a view similar to FIG. 2, with melting furnace 10 being closed by means of furnace cover 18, and electrodes 19 being in working position for the melting operation. During this operation, snowpipes 15 are rinsed with gas in order to prevent blockage.

What is claimed is:

1. A method of suppressing dust and fumes in the production of steel in an electric melting furnace from unmelted iron scrap products containing combustible constituents, the method comprising charging the iron scrap products in a melting vessel containing metal which is partly molten, and introducing solid carbon dioxide into the melting vessel before, during and after charging the iron scrap products to prevent explosive burning of the combustible constituents, oxygen present in the melting vessel being displaced before, during and after charging the iron scrap products by expanding gaseous carbon dioxide produced from the solid carbon dioxide.

2. The method of claim 1, and comprising the further step of forming the solid carbon dioxide by passing liquid carbon dioxide through at least one snowpipe for forming carbon dioxide snow, the at least one snowpipe including an orifice therein for decompressing the liquid carbon dioxide to form carbon dioxide snow, the liquid carbon dioxide leaving the orifice being subjected to a rapid drop in pressure and thus turning into carbon dioxide snow.

3. The method of claim 2, wherein the at least one snowpipe is fixed in a water-cooled upper part of the electric melting furnace, and comprising the further step of introducing inert gas into the at least one snowpipe for keeping the at least one snowpipe open.

4. The method of claim 2, and comprising the further steps of extending the at least one snowpipe over the melting vessel during charging the iron scrap products to a point where the charging is not impeded and retracting the at least one snowpipe immediately after charging.

5. The method of claim 1, wherein the solid carbon dioxide is introduced in the form of dry-ice pellets.

6. The method of claim 1, wherein the solid carbon dioxide is introduced in the form of dry snow.

7. The method of claim 1, wherein the iron products are selected from the group consisting of pig iron, scrap iron, iron pellets, allow metals, and mixtures of the foregoing, all having greatly varying impurities.

8. The method of claim 1, wherein the electric melting furnace is an arc furnace having a refractory-lined melting vessel and a water-cooled upper part.

9. The method of claim 8, wherein the iron products are selected from the group consisting of pig iron, scrap iron, iron pellets, alloy metals, and mixtures of the foregoing, all having greatly varying impurities.

10. The method of claim 8, and comprising the further step of forming the solid carbon dioxide by passing liquid carbon dioxide through at least one snowpipe, the at least one snowpipe including an orifice therein for decompressing the liquid carbon dioxide to form carbon dioxide snow, the liquid carbon dioxide leaving the orifice being subjected to a rapid drop in pressure and thus turning into carbon dioxide snow.

11. The method of claim 10, wherein the at least one snowpipe is fixed in a water-cooled upper part, and comprising the further step of introducing inert gas into the at least one snowpipe for keeping the at least one snowpipe open.

12. The method of claim 10, and comprising the further steps of extending the at least one snowpipe over the melting vessel during charging the iron scrap products to a point where the charging is not impeded and retracting the at least one snowpipe immediately after charging the iron scrap products.

* * * * *

UNITED STATES PATENT AND TRADEMARK OFFICE
CERTIFICATE OF CORRECTION

PATENT NO. : 5,343,491
DATED : August 30, 1994
INVENTOR(S) : Georges Herren et al.

It is certified that error appears in the above - identified patent and that said Letters Patent is hereby corrected as shown below:

In col. 6, line 37, change "allow" to —alloy—.

Signed and Sealed this

Fifteenth Day of November, 1994

Attest:

BRUCE LEHMAN

Attesting Officer

Commissioner of Patents and Trademarks